(12) United States Patent
Nespor

(10) Patent No.: US 7,392,975 B2
(45) Date of Patent: Jul. 1, 2008

(54) VEHICLE MOUNTED WINCH ASSEMBLY WITH POWERED SLIDING CABLE GUIDE

(75) Inventor: Ronald B. Nespor, Greenville, PA (US)

(73) Assignee: Miller Industries Towing Equipment Inc, Ooltewah, TN (US)

( * ) Notice: Subject to any disclaimer, the term of this patent is extended or adjusted under 35 U.S.C. 154(b) by 0 days.

(21) Appl. No.: 11/565,798

(22) Filed: Dec. 1, 2006

(65) Prior Publication Data

US 2008/0131247 A1 Jun. 5, 2008

(51) Int. Cl.
*B66D 1/36* (2006.01)
*B65H 27/00* (2006.01)
*B65F 3/26* (2006.01)

(52) U.S. Cl. .............. 254/326; 254/323; 242/397; 242/615.1; 414/478; 414/563

(58) Field of Classification Search ......... 254/323, 254/325, 326, 327, 334, 335, 336, 338; 414/560, 414/563, 538, 494, 559, 478, 475; 242/615.1, 242/397–397.3
See application file for complete search history.

(56) References Cited

U.S. PATENT DOCUMENTS

| | | | |
|---|---|---|---|
| 1,457,947 A | | 6/1923 | Stanbrough |
| 2,473,628 A | | 6/1949 | Allison |
| 3,144,998 A | * | 8/1964 | Back ............... 242/157.1 |
| 3,231,260 A | * | 1/1966 | Shirley .............. 49/139 |
| 4,062,461 A | * | 12/1977 | Vincent ............. 414/24.5 |
| 4,127,295 A | * | 11/1978 | Robinson ............ 293/117 |
| 4,148,445 A | * | 4/1979 | Reynolds et al. ....... 242/388.7 |
| 4,541,584 A | * | 9/1985 | Rivinius ............ 242/486.6 |
| 4,946,333 A | | 8/1990 | Boatwright |
| 5,456,564 A | | 10/1995 | Bianchini |
| 5,509,639 A | | 4/1996 | Ellis |
| 5,529,454 A | * | 6/1996 | Alm et al. ........... 414/478 |
| 5,967,496 A | * | 10/1999 | Ulrich et al. ......... 254/326 |
| 6,126,378 A | * | 10/2000 | Landoll et al. ........ 414/494 |
| 6,276,890 B1 | | 8/2001 | Pratt |

(Continued)

FOREIGN PATENT DOCUMENTS

DE G8525623.4 12/1985

(Continued)

OTHER PUBLICATIONS

Bushey Hall—Winchmaster; BHW Group; www.bhwgroup.co.uk; advertisement for Reel-Smart.

*Primary Examiner*—Evan H Langdon
(74) *Attorney, Agent, or Firm*—Michael P. Mazza

(57) ABSTRACT

Disclosed is a vehicle mounted winch and cable assembly that may include a slide track, a winch, a cable guide and a powering means. Also disclosed is a related method. The slide track may be rigidly mounted to the vehicle and may have a track axis extending generally perpendicular to a longitudinal axis of the vehicle. The winch may be rigidly mounted to the vehicle for accepting and discharging the cable. The cable guide may be movably secured to the slide track and may accept the cable from the winch and then redirect the cable from a direction generally parallel to the track axis to a direction generally perpendicular to the track axis. The powering means may adjustably move the cable guide along the slide track.

28 Claims, 8 Drawing Sheets

U.S. PATENT DOCUMENTS

| | | | |
|---|---|---|---|
| 6,443,431 B1 * | 9/2002 | Stasny et al. | 254/385 |
| 6,520,736 B2 * | 2/2003 | Pratt | 414/812 |
| 6,568,892 B2 * | 5/2003 | Landoll et al. | 410/80 |
| 6,572,082 B1 * | 6/2003 | Dixon et al. | 254/323 |
| 6,631,886 B1 * | 10/2003 | Caudle et al. | 254/327 |
| 7,137,586 B2 * | 11/2006 | Talen | 242/481 |

FOREIGN PATENT DOCUMENTS

| | | |
|---|---|---|
| EP | 0875483 A2 | 4/1998 |
| EP | 0875483 A3 | 4/1998 |
| EP | 0875483 B1 | 7/2003 |
| FR | 2474470 | 1/1980 |

* cited by examiner

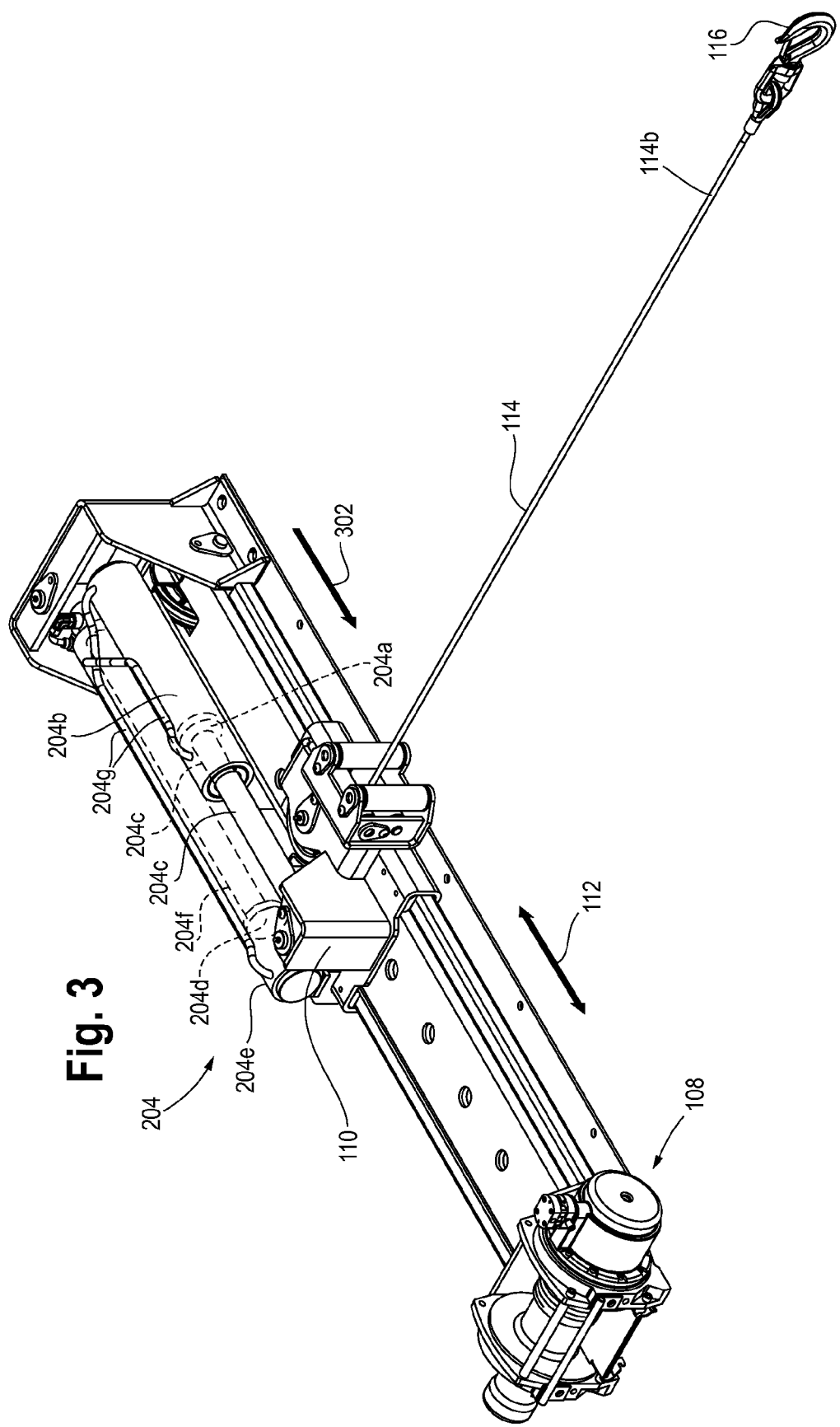

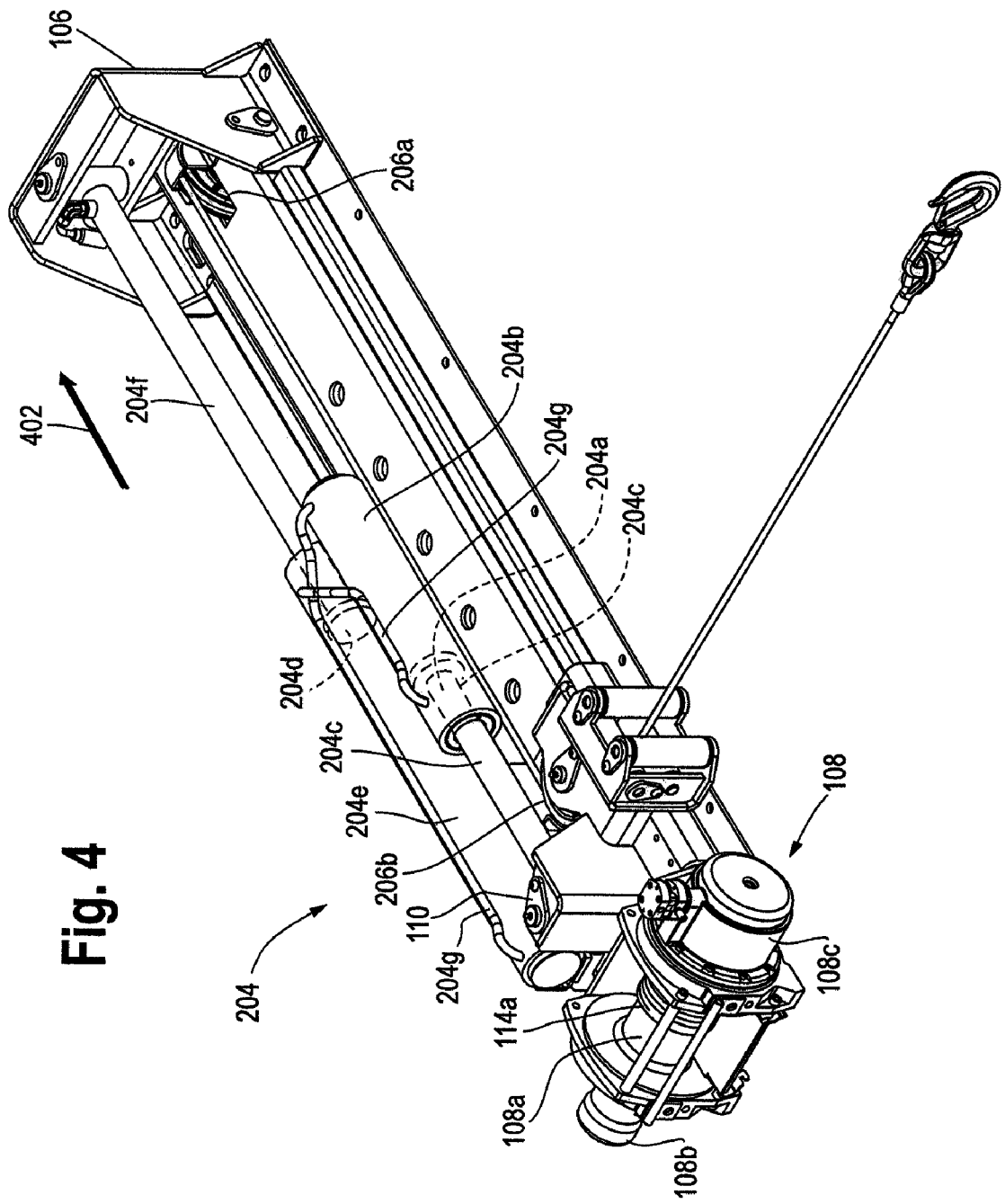

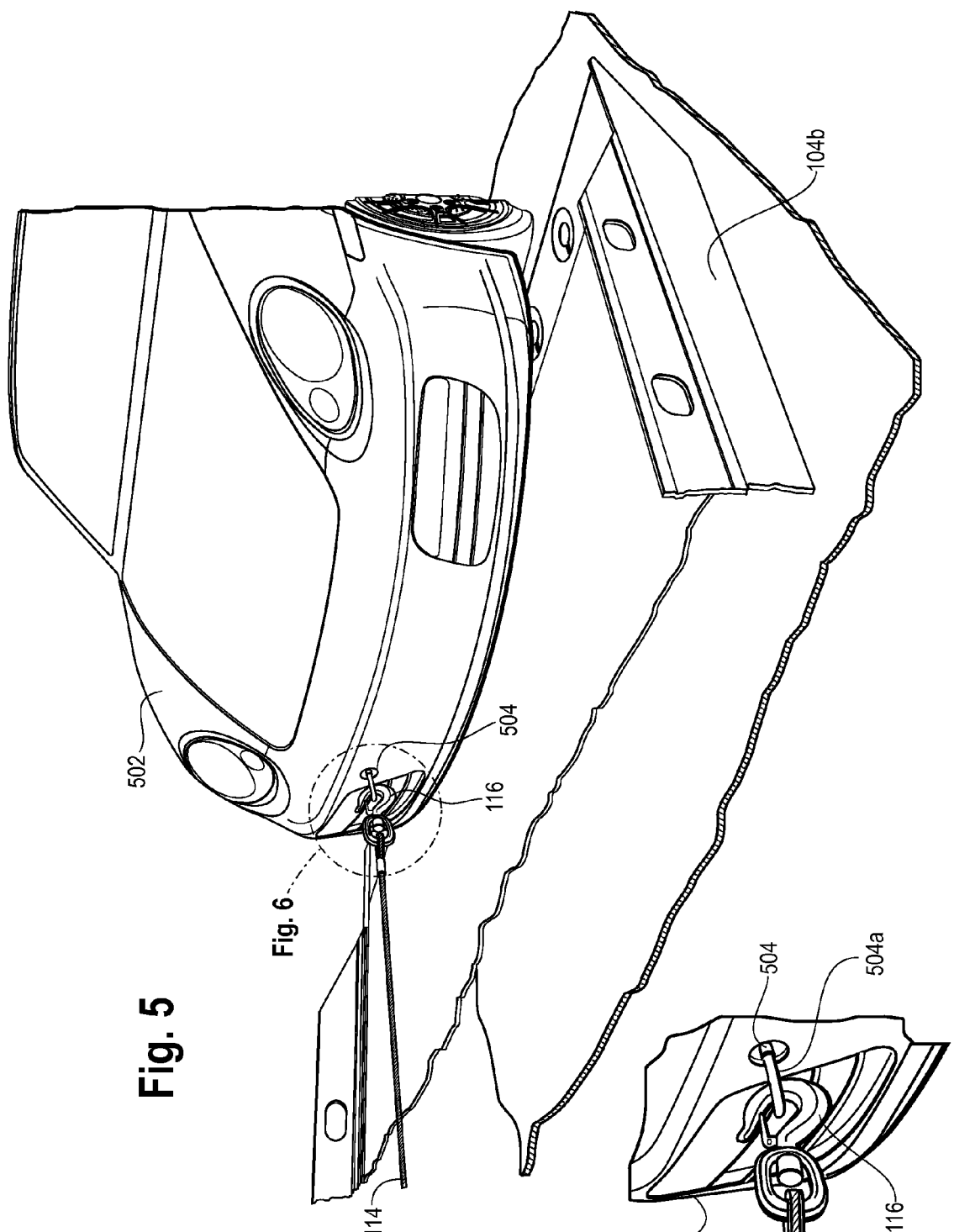

VEHICLE MOUNTED WINCH ASSEMBLY WITH POWERED SLIDING CABLE GUIDE

FIELD OF THE INVENTION

The present invention generally relates to an apparatus and method for moving vehicles onto the bed of another vehicle. In particular, the invention relates to a winch assembly having a cable that is laterally adjustable using a powered slidable cable guide, and a related method for transferring a vehicle to the bed of another vehicle.

BACKGROUND OF THE INVENTION

Carrying vehicles are known in which the vehicle to be transported is pulled onto the bed of the transporting vehicle. Traditionally, the transporting vehicle employed a winch centered on the bed near the cab of the transporting vehicle. The traditional system remains useful for vehicles designed to be pulled from a centered location. However, certain vehicles now have towing eye bolts that are located off the center of the vehicles. This arrangement may lead to damage to the transported vehicle, and to the towing equipment, when the traditional centered winch arrangement is used.

To address the problem, the industry has employed systems that allow the cable running between the winch on the transporting vehicle and the towing eye bolt of the transported vehicle to be offset, in order to laterally align with the location of the towing eye bolt. For example, such a system is disclosed in European Patent Specification, EP 0 875 483 A3, published on Jun. 2, 1999 and titled "Winch Apparatus," which is entirely incorporated herein by reference. However, these known systems require manual movement and/or locking of portions of the towing system in order to allow a full range of motion across the bed of the transporting vehicle. Manual movement and/or locking may lead to injury and/or damage to towing equipment and/or the transported vehicle.

Accordingly, it would be advantageous to provide an assembly and method which solves the above referenced problems while maintaining advantages of such known assemblies and methods.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

In the claims, a "slide track" is any structure capable of supporting the cable guide while allowing the cable guide to be moved laterally on the vehicle.

In the claims, a "cable guide" is any structure capable of redirecting the cable from a first orientation to an orientation that is generally parallel to the longitudinal axis of the vehicle to be towed.

In the claims, a "powering means" is any structure that is capable of moving the cable guide along the slide track that does not require the operator to manually move the cable guide.

In the claims, a "piston" is any structure that is capable of converting liquid and/or gas pressure into movement.

SUMMARY OF THE INVENTION

The objects mentioned above, as well as other objects, are solved by the present invention, which overcomes disadvantages of prior winch systems, while providing new advantages not previously obtainable with such assemblies. The present invention provides a vehicle mounted winch and cable assembly that may include a slide track, a winch, a cable guide and a powering means. The slide track may be rigidly mounted to the vehicle and may have a track axis extending generally perpendicular to a longitudinal axis of the vehicle. The winch may be rigidly mounted to the vehicle for accepting and discharging the cable. The cable guide may be movably secured to the slide track and may accept the cable from the winch and then redirect the cable from a direction generally parallel to the track axis to a direction generally perpendicular to the track axis. The powering means may adjustably move the cable guide along the slide track.

In other separate and/or integrated embodiments, the powering means may include one or more pistons. The pistons may be enclosed in cylinders that may be rigidly attached to each other. The pistons may have rods extending in opposite directions. The simultaneous extension of piston rods may drive movement of the cable guide. The pistons may be hydraulic pistons. And, the pistons may have different lengths.

In additional separate and/or integrated embodiments, the vehicle may have a bed with a bed width, and the cable guide may substantially traverse the entire bed width. The powering means may include a piston having a cylinder and the assembly may further comprise a wear pad supporting the cylinder. The wear pad may be rigidly mounted to the cable guide. The assembly may include a second piston, wherein the first piston is substantially longer than the second piston. The assembly may also include slide pads between the cable guide and the slide track.

In still further additional separate and/or integrated embodiments, cable guide may include a pulley for redirecting the cable. The movement of the cable guide may be electronically controlled. The winch may be stationary. And, the powering means may include hydraulic lines that are rigidly mounted to the powering means.

A method of practicing the invention may include the steps of laterally collecting a cable on a bed of the transporting vehicle; redirecting the cable to a back portion of the bed; and using a powered means to laterally move the location where the cable is redirected across the bed of the vehicle.

Other systems, methods, features, and advantages of the present invention will be, or will become, apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 3 is a view of the winch assembly showing the cable guide in a second position;

FIG. 4 is a view of the winch assembly showing the cable guide in a third position;

FIG. 5 is a front view of the cable and hook connected to a vehicle with an off-center towing eye bolt;

FIG. 6 is a more detailed view of the hook and towing eye bolt of FIG. 5;

The components in the drawings are not necessarily to scale, emphasis instead being placed upon clearly illustrating the principles of the present invention. In the drawings, like reference numerals designate corresponding parts throughout the several views.

DETAILED DESCRIPTION OF PREFERRED EMBODIMENTS

Set forth below is a description of what are believed to be the preferred embodiments and/or best examples of the invention claimed. Future and present alternatives and modifications to the preferred embodiments are contemplated. Any alternatives or modifications which make insubstantial changes in function, in purpose, in structure, or in result are intended to be covered by the claims of this patent.

Figure 1:
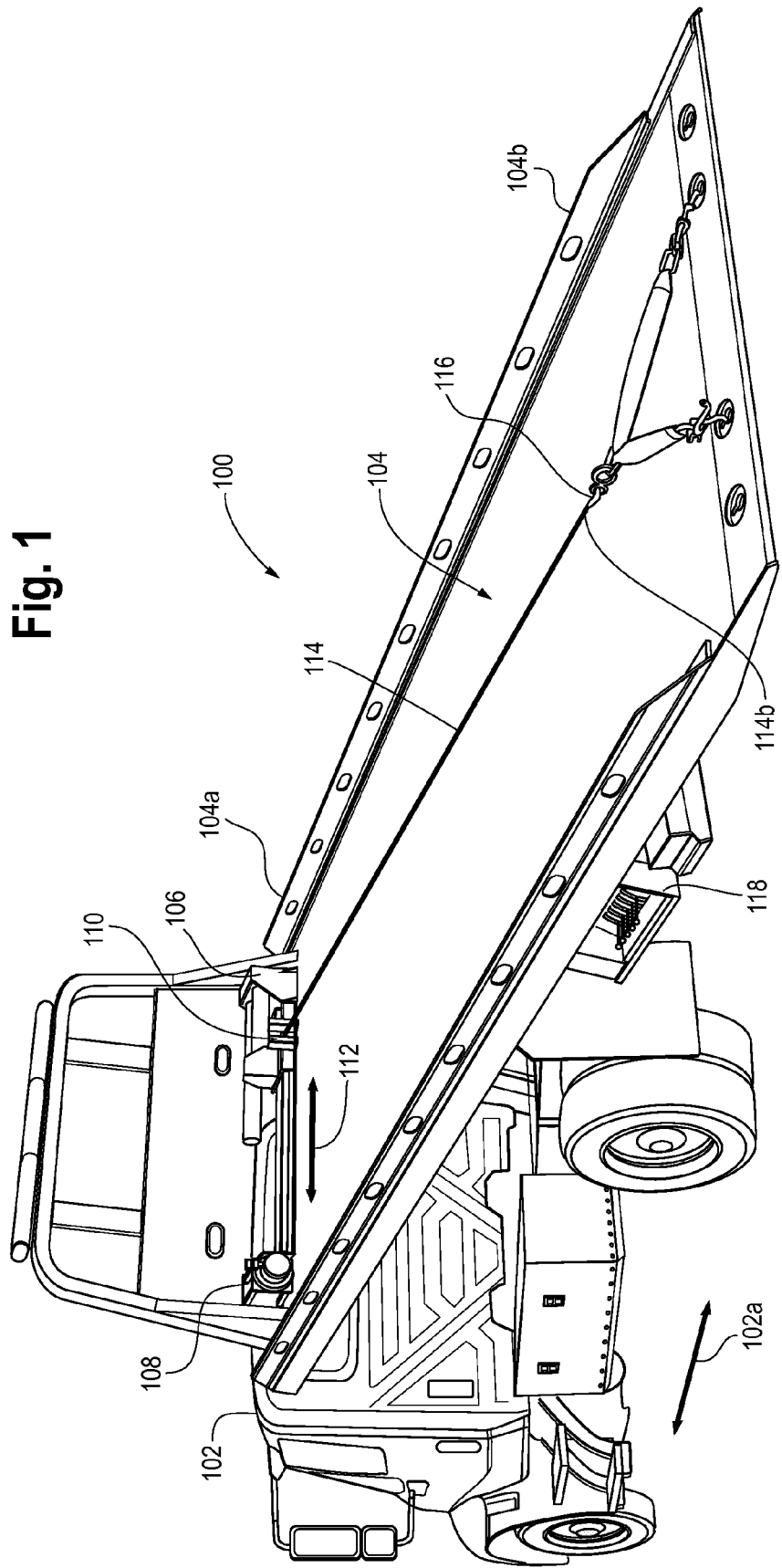
FIG. 1 is view of a transporting vehicle having a tilting bed with a winch assembly and a movable cable guide.

Referring initially to FIG. 1, a representative view 100 of a transporting vehicle is provided. In the representative view 100, a truck 102 having a bed 104 employing an embodiment of the invention is shown that may include a towing assembly 106 having a winch 108 and a cable guide 110. The size of winch 108 may be configured for the intended application. In one embodiment, winch 108 has a drum 108a, a winch driver 108b, and a housing 108c for gears (see FIG. 2). In one embodiment, drum 108a is a 6.5-inch drum Cable guide 110 is capable of moving laterally along the width of bed 104, as shown by reference arrow 112, on a front portion 104a of bed 104.

A cable 114 may have a first end 114a (see FIG. 2) secured to drum 108a. Cable 114 may initially extend laterally toward cable guide 110. After being redirected by a first winch pulley 206a (see FIG. 2), cable guide 110 may redirect cable 114 around second winch pulley 206b and toward a back portion 104b of bed 104. A hook 116 may be secured to a second end 114b of cable 114. Bed 104 may be capable of tilting. Bed 104, winch 108, and cable guide 110 may be operated separately and/or through a control station 118 having controls for a plurality of devices. Control station 118 may be located near the back portion 104b of bed 104. In other embodiment, control station 118 my include controls for one or more of bed 104, winch 108, and cable guide 110 and may be located in the cab of the truck 102, wirelessly, and/or tethered to truck 102 in some other convenient manner.

Truck 102 may be viewed as having a longitudinal axis, illustrated by arrow 102a, extending from the front, to the rear, of truck 102. Cable guide 110 may move laterally, illustrated by arrow 112, which may be perpendicular to the longitudinal axis 102a of truck 102.

Figure 2:
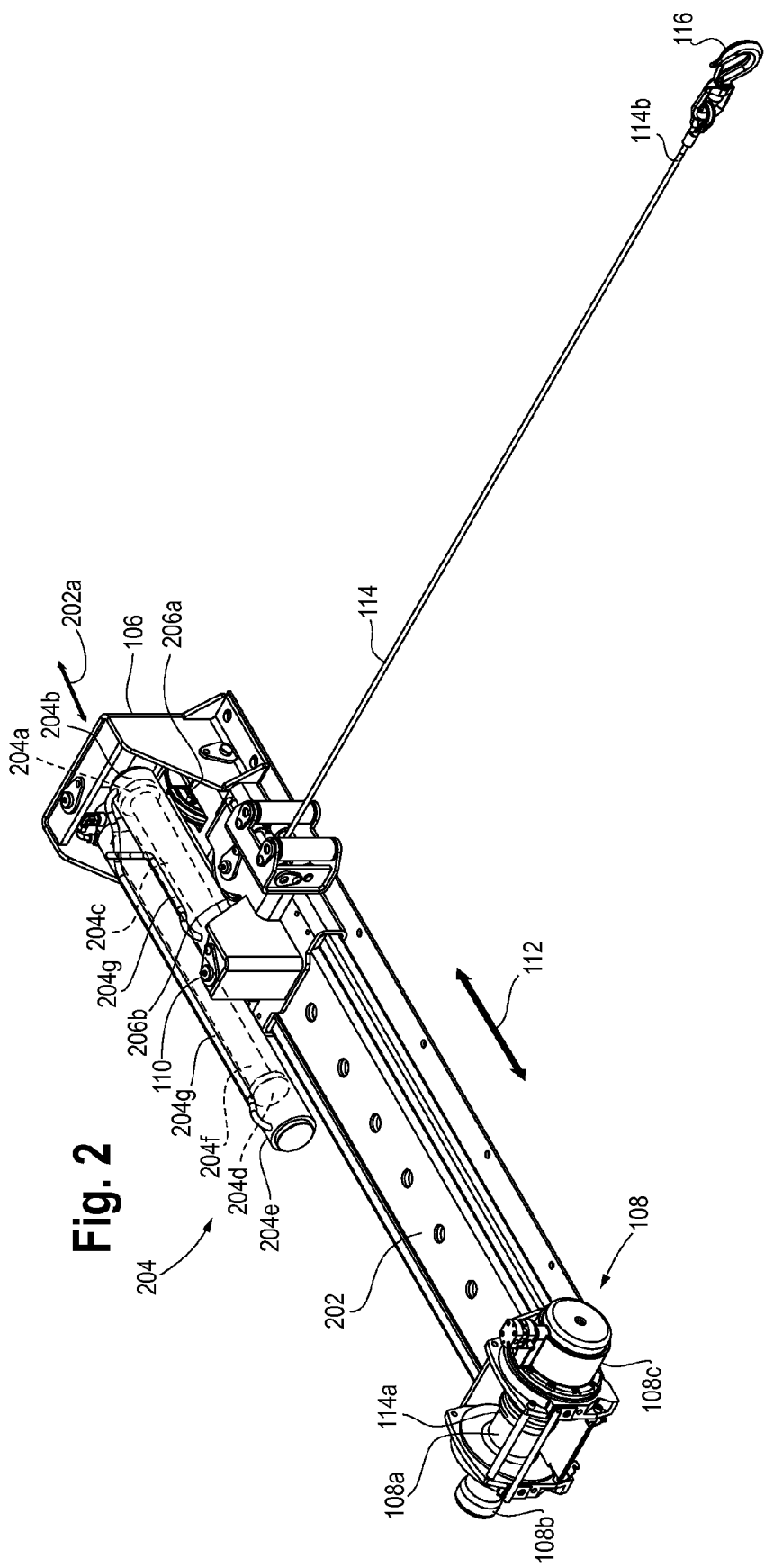
FIG. 2 is a view of the winch assembly showing the cable guide in a first position with a cable and hook extending from the cable guide.

FIG. 2 shows towing assembly 106 with cable guide 110 in a first position with cable 114 extending from cable guide 110. Cable guide 110 may be movably secured to a slide track 202. Slide track 202 may be rigidly mounted to bed 104 of truck 102 (see FIG. 1). Slide track 202 may have a track axis, illustrated by arrow 202a, that lies generally perpendicular to the longitudinal axis 102a of truck 102 (see FIG. 1). Track axis 202a may also be parallel to, and/or coincident, with the lateral movement 112 (see FIG. 1) of cable guide 110.

Cable guide 110 may be moved along slide track 202 by a powering means 204, such as but not limited to, one or more pistons, such as first piston 204a and second piston 204d, and/or a screw jack. First piston 204a may be enclosed in a housing, such as but not limited to, a first cylinder 204b and may be associated with first rod 204c. Second piston 204d may be enclosed in a housing, such as but not limited to, a second cylinder 204e and may be associated with second rod 204f. Powering means 204 may be operated through control station 118 (see FIG. 1). Powering means 204 may cause cable guide 110 to move along slide track 202 in the direction of track axis 202a.

In the embodiment illustrated in FIG. 2, where powering means 204 includes pistons 204a and 204d and hydraulic lines 204g, cylinders 204b and 204e may be rigidly attached to each other. Hydraulic lines 204g may be configured to control the operating pressure for pistons 204a and 204d. Hydraulic lines 204g may be any conduit or structure for causing movement of pistons 204a and 204d, such as but not limited to, hoses, tubes, and pipes. In one embodiment, hydraulic lines 204g are rigidly attached to cylinders 204b and 204e in order to avoid entanglement during operation of towing assembly 106.

The rigid attachment of cylinders 204b and 204e, and/or other piston housing, to each other may be accomplished through means such as, but not limited to, welding, bolting, and the use of a two-chamber housing. In the embodiment illustrated, piston rod 204c is shorter than piston rod 204f. The arrangement illustrated beneficially allows the cable guide 110 to be moved laterally across a large portion of the width of bed 104. Assuming the orientation illustrated in FIG. 2, when both pistons 204a and 204d are in a retracted position within cylinders 204b and 204e, cable guide 110 may move close to the passenger edge of bed 104. When both pistons 204a and 204b are in a fully extended position within cylinders 204b and 204e, cable guide 110 may move close to the driver edge of bed 104. In one embodiment, pistons 204a and 204d operate simultaneously such that both pistons 204a and 204d are retracting, or extending, at the same time.

In addition to components previously discussed, towing assembly 106 may also include a first winch pulley 206a, and a second winch pulley 206b. Winch driver 108b may be any device capable of causing rotation of drum 108a, such as but not limited to, an electric motor and a hydraulic motor. Winch driver 108b may be operated through control station 118. As winch driver 108b rotates drum 108a, cable 114 may be drawn upon, or discharged from, drum 108a. Cable 114 may run underneath slide track 202, around first winch pulley 206a, around second winch pulley 206b (also see FIG. 9), and may then be attached to hook 116. Second winch pulley 108b may be oriented perpendicular to first winch pulley 108a in order to redirect cable 114 from a direction generally parallel to track axis 202a to a direction generally perpendicular to track axis 202a.

Illustrated in FIGS. 3 and 4 are views of towing assembly 106 in a second and third position, respectively, along slide track 202. In FIGS. 3 and 4, powering means 204 has moved cable guide 110 along slide track 202. In FIG. 3, powering means 204 moves slide track 202 to the second position as first rod 204c extends from cylinder 204b in a first direction, illustrated by arrow 302. In FIG. 4, powering means 204 moves cable guide 110 to the third position as second rod 204f extends from second cylinder 204e in a direction, illustrated by arrow 402, that is opposite to the direction 302 that first rod 204c extends from first cylinder piston 204b.

Shown in FIGS. 5 and 6 is a view, and a more detailed view, respectively, of cable 114 and hook 116 connected to a second vehicle 502 having an off-center securing point 504, in the example illustrated, a towing eye bolt 504a. The lateral movement 112 of cable guide 110 along slide track 202 allows second vehicle 502 to be pulled onto bed 104 of first vehicle 102 while generally maintaining the orientation of second vehicle 502 in the same plane as the longitudinal axis 102a of first vehicle 102.

Figure 7:
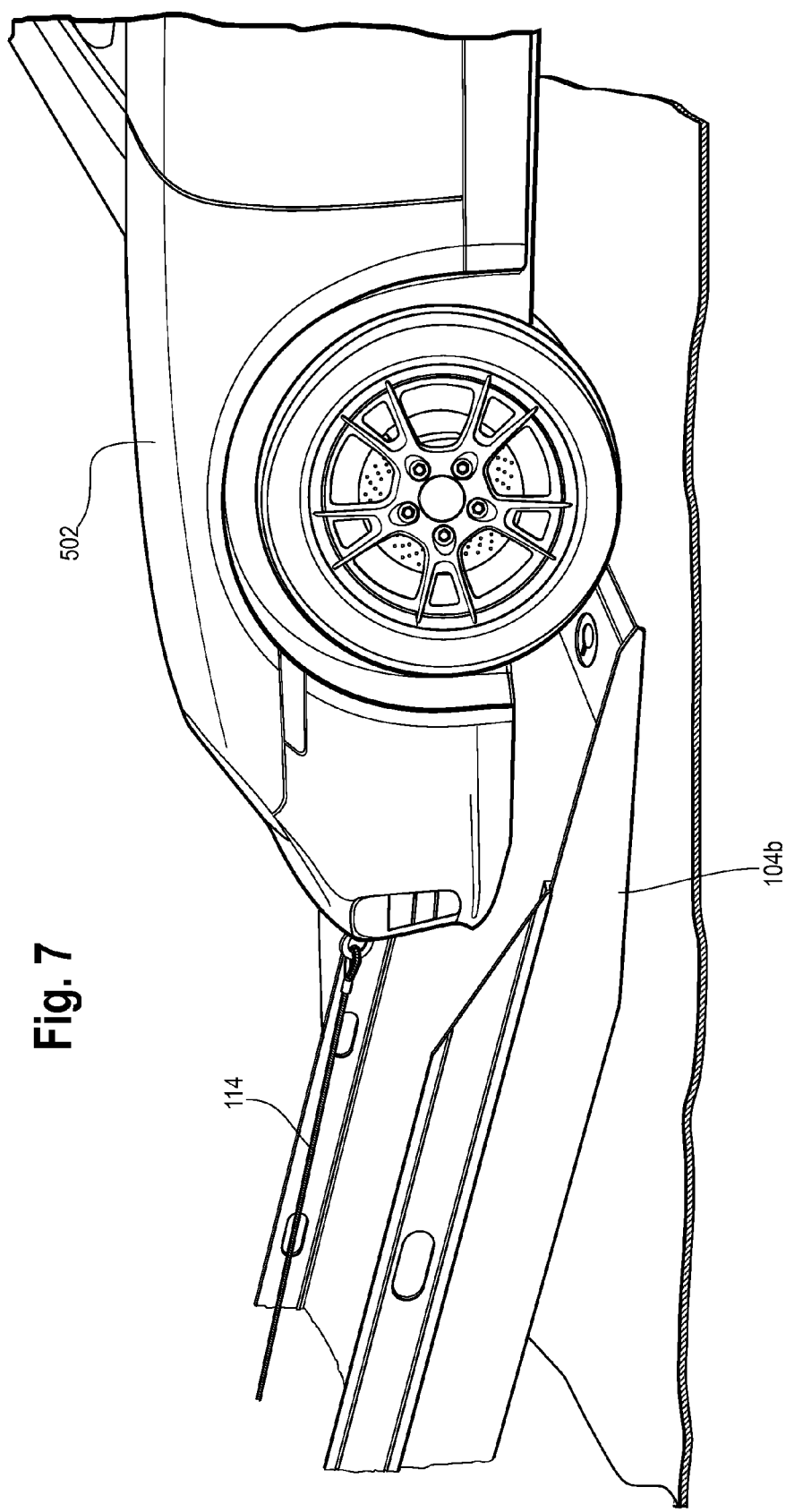
FIG. 7 is a side view of the cable and hook connected to a vehicle to be transported, with the vehicle in a first position.
Figure 8:
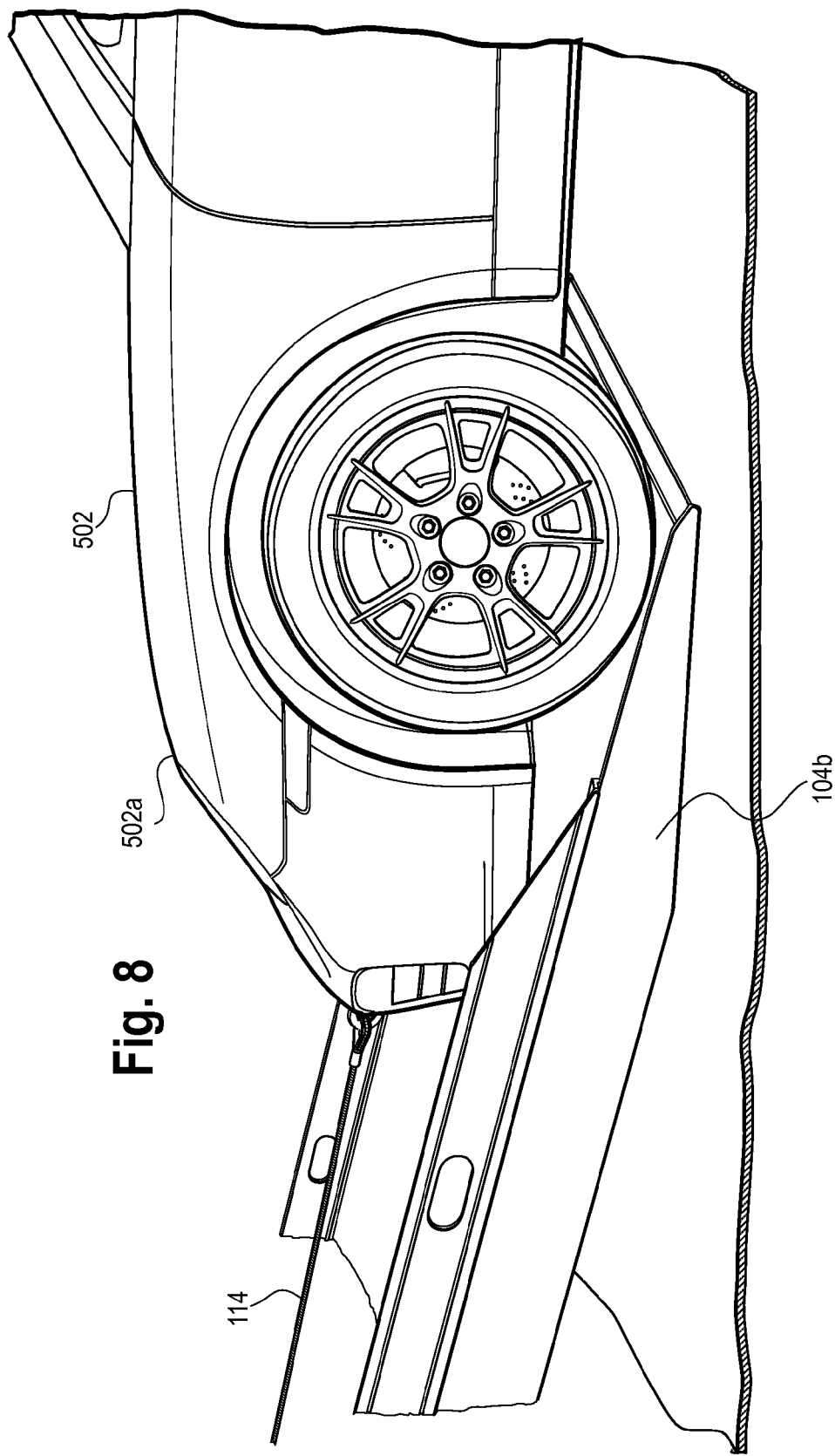
FIG. 8 is a side view of the cable and hook connected to the vehicle to be transported of FIG. 7, with the vehicle in a second position.

Illustrated in FIG. 7 is a side view of cable 114 connected to second vehicle 502 as second vehicle 502 is being initially pulled onto bed 104 of truck 102. Illustrated in FIG. 8 is a side view of cable 114 connected to second vehicle 502 as the front portion 502a of second vehicle 502 is on the back portion 104b of bed 104 of truck 102.

Figure 9:
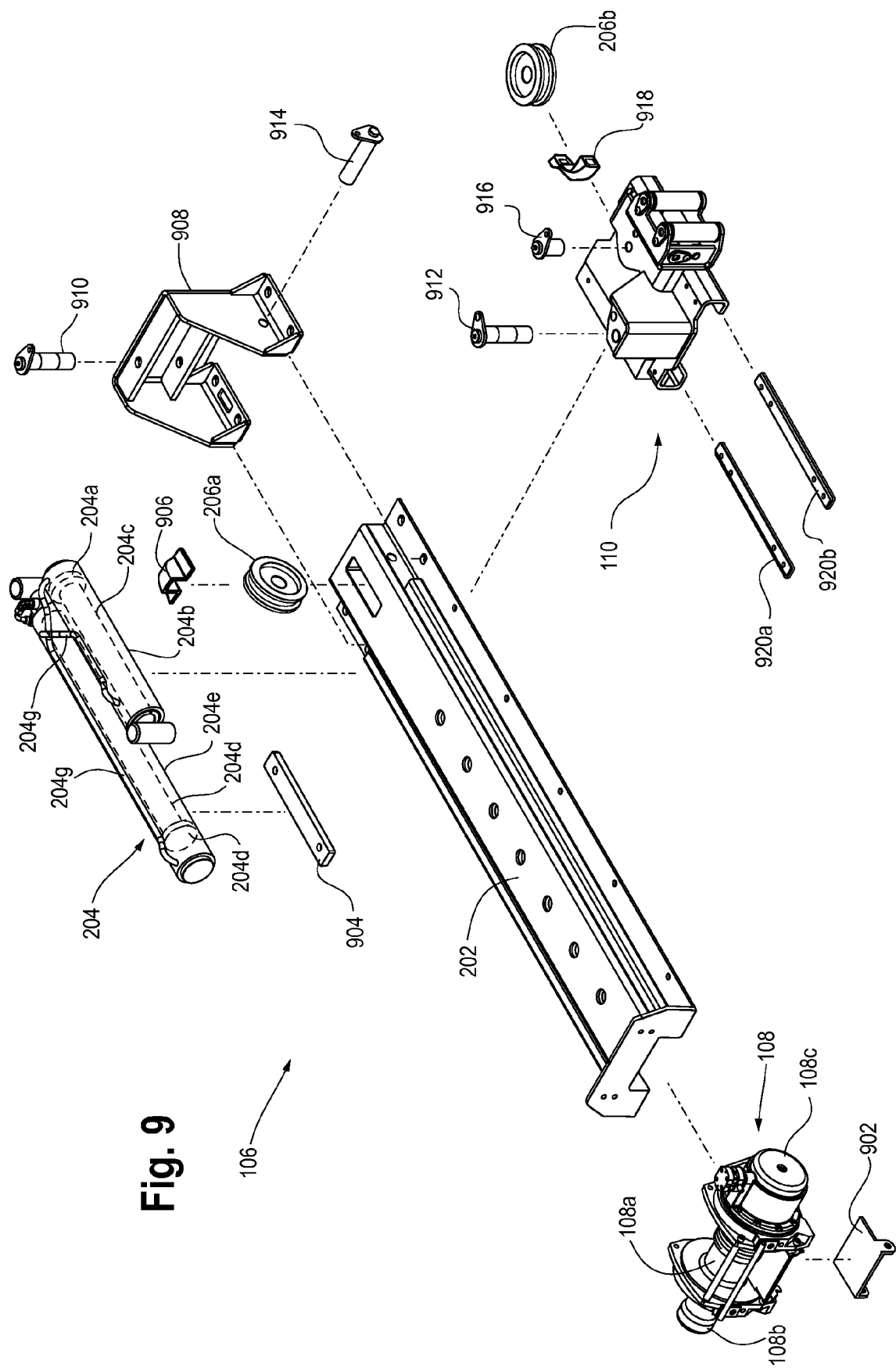
FIG. 9 is an exploded view of the winch assembly of FIGS. 1-4.

Illustrated in FIG. 9 is an exploded view of towing assembly 106. In addition to components previously discussed, towing assembly 106 may include a cable tensioner plate 902, a wear pad 904, a pulley cover 906, a mounting bracket 908, cylinder mounting pins 910 and 912, pulley pins 914 and 916, a pulley cover 918, and slide pads 920a and 920b.

Cable tensioner 902 may be used to keep cable 114 in contact with winch drum 108b, and to force cable 114 to form adjacent coils on drum 108b when cable 114 is retracted onto drum 108b. In one embodiment, wear pad 904 may be mounted to either the cable guide 110 or second cylinder 204e in order to support second cylinder 204e while allowing movement between cable guide 110 and second cylinder 204e during the movement of first and/or second pistons 204a and 204d.

Pulley cover 906 maintains alignment of cable 114 as cable 114 is redirected by first winch pulley 206a. Mounting bracket 908 provides a support for cylinders 204b and 204e through second rod 204f (see FIG. 4). Cylinder rod pin 910 secures second rod 204f to a fixed location. Cylinder rod pin 912 secures first rod 204c (see FIG. 3) to a fixed location on cable guide 110. Pulley pin 914 provides an axis and a securing point for first winch pulley 206a. Pulley pin 916 provides an axis and a securing point for second winch pulley 206b. And, slide pads 920a and 920b provide a slideable support for cable guide 110 upon slide track 202.

The above description is not intended to limit the meaning of the words used in the following claims that define the invention. For example, while several possible designs have been described above, persons of ordinary skill in the art will understand that a variety of other designs still falling within the scope of the following claims may be envisioned and used. It is contemplated that these or other future modifications in structure, function or result will exist that are not substantial changes and that all such insubstantial changes in what is claimed are intended to be covered by the claims.

We claim:

1. A vehicle-mounted winch and cable assembly, comprising:
   a slide track rigidly mounted to the vehicle and having a track axis extending generally perpendicular to a longitudinal axis of the vehicle;
   a winch rigidly mounted to the vehicle for collecting and discharging the cable;
   a cable guide movably secured to the slide track, the cable guide accepting the cable from the winch and redirecting the cable from a direction generally parallel to the track axis to a direction generally perpendicular to the track axis; and
   powering means for adjustably moving the cable guide along the slide track, wherein the powering means comprises two hydraulic cylinders attached to each other and of different lengths, each having associated first and second piston rods extending in opposite directions substantially perpendicular to a longitudinal axis of the vehicle.

2. The winch and cable assembly of claim 1, wherein simultaneous extension of the piston rods drives movement of the cable guide.

3. The winch and cable assembly of claim 1, wherein the two pistons are configured to be driven by hydraulic pressure.

4. The winch and cable assembly of claim 1, wherein the vehicle has a bed with a bed width, and wherein the cable guide is capable of substantially traversing the entire bed width.

5. The winch and cable assembly of claim 1, wherein the assembly further comprises a wear pad supporting each cylinder.

6. The winch and cable assembly of claim 5, wherein each wear pad is rigidly mounted to the cable guide.

7. The winch and cable assembly of claim 1, wherein the first piston's rod is substantially longer than the second piston's rod.

8. The winch and cable assembly of claim 1, further comprising slide pads between the cable guide and the slide track.

9. The winch and cable assembly of claim 1, wherein the cable guide includes a pulley for redirecting the cable.

10. The winch and cable assembly of claim 1, wherein movement of the cable guide is electronically controlled.

11. The winch and cable assembly of claim 1, wherein the winch is stationary.

12. A vehicle-mounted winch and cable system, comprising:
    means for laterally collecting and laterally discharging the cable on a bed of the vehicle;
    means for accepting the cable from the means for laterally collecting and laterally discharging and redirecting the cable to a back portion of the bed; and
    powering means for moving the means for accepting and redirecting laterally on the bed of the vehicle, wherein the powering means comprises two hydraulic cylinders attached to each other and of different lengths, each having associated first and second piston rods extending in opposite directions substantially perpendicular to a longitudinal axis of the vehicle.

13. The winch and cable system of claim 12, wherein simultaneous extension of the piston rods drives movement of the cable guide.

14. The winch and cable system of claim 12, wherein the two pistons are configured to be driven by hydraulic pressure.

15. The winch and cable system of claim 12, wherein the vehicle bed has a bed width, and wherein the means for accepting and redirecting the cable is capable of substantially traversing the entire bed width.

16. The winch and cable system of claim 12, wherein system further comprises a wear pad supporting each cylinder.

17. The winch and cable system of claim 16, wherein each wear pad is rigidly mounted to the means for accepting and redirecting the cable.

18. The winch and cable system of claim 12, wherein the first piston's rod is substantially longer than the second piston's rod.

19. The winch and cable system of claim 12, wherein the means for accepting and redirecting the cable includes a pulley for redirecting the cable.

20. The winch and cable system of claim 12, wherein movement of the means for accepting and redirecting the cable is electronically controlled.

21. The winch and cable system of claim 12, wherein the means for laterally collecting and laterally discharging the cable is stationary.

22. The winch and cable system of claim 12, wherein the powering means includes hydraulic lines.

23. A method for pulling a first vehicle onto the bed of a transporting vehicle, comprising the steps of:
   collecting a cable on a bed of the transporting vehicle;
   redirecting the cable to a back portion of the bed; and
   using a powering means to laterally move the location where the cable is redirected across the bed of the vehicle, wherein the powering means comprises two hydraulic cylinders attached to each other and of different lengths, each having associated first and second piston rods extending in opposite directions substantially perpendicular to a longitudinal axis of the vehicle.

24. The method of claim 23, wherein simultaneous extension of the piston rods drives movement of the cable guide.

25. The method of claim 23, wherein the two pistons are configured to be driven by hydraulic pressure.

26. The method of claim 23, wherein the step of redirecting the cable includes the use of a pulley.

27. The method of claim 23, wherein the step of using a powering means includes using a electronic controls.

28. The method of claim 23, wherein the step of laterally collecting a cable is performed at a fixed location on the bed.

* * * * *